E. BÜRGIN.
Apparatus for Deaerating Water.
No. 199,785. Patented Jan. 29, 1878.
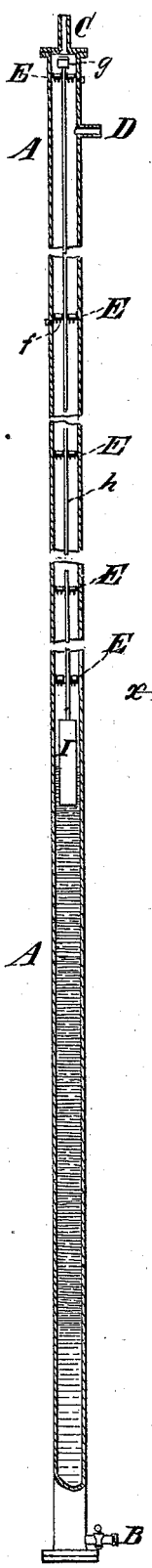
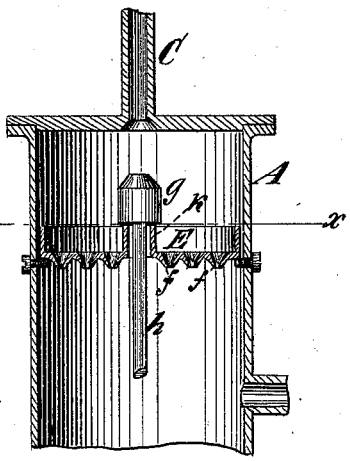
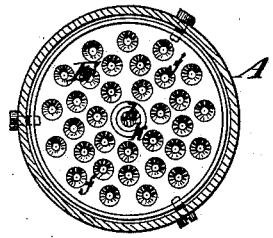

UNITED STATES PATENT OFFICE.

EMIL BÜRGIN, OF NEW YORK, N. Y.

IMPROVEMENT IN APPARATUS FOR DEAERATING WATER.

Specification forming part of Letters Patent No. 199,785, dated January 29, 1878; application filed July 30, 1877.

*To all whom it may concern:*

Be it known that I, EMIL BÜRGIN, of the city and State of New York, have invented an Improvement in Apparatus for Deaerating Water and other Liquids; and I do hereby declare that the following is a full, clear, and exact description of the same, reference being had to the accompanying drawing, forming part of this specification.

My invention has for its object the extraction from water of its contained air, more especially with reference to the use of the deaerated water for the manufacture of ice, it being a well-known fact that when water is so rapidly frozen as not to permit the exclusion of its contained air by the congelation of the water the product will be porous and opaque unless the air be previously extracted by artificial means.

My invention supplies such means, and in its features combines cheapness, durability, simplicity, and efficiency.

Figure 1 in the drawing represents a partial vertical central section and a partial side view of my improved deaerating apparatus. Fig. 2 is an enlarged sectional detail. Fig. 3 is a cross-section on the line $x\ x$ in Fig. 2.

In carrying out my invention I preferably employ a vertical hollow column, A, Figs. 1 and 2, having a height of from sixty to seventy-five feet, thirty (more or less) feet of the lower part being needed to give sufficient hydrostatic pressure to water contained therein to overcome external atmospheric pressure, and allow such water to flow out from the bottom of the column when the air is exhausted from the cylinder above the water, as hereinafter described. But the said column may be made shorter, and a discharge-pipe made to descend from the lower part thereof to a distance sufficient to give the necessary hydrostatic pressure.

B represents the outlet for water in the lower part of the hollow column A, and C the inlet for water at the upper part of said column. D is an outlet for air, the air being extracted from the hollow column by an air-pump connected with said outlet.

The rapidity with which air escapes from a liquid when external atmospheric pressure is removed depends upon the extent of the surface through which the air can pass, and upon the reduction of hydrostatic pressure upon the air imprisoned in the water.

In my invention I secure both a very large extent of liquid-surface and a very large reduction of hydrostatic pressure in the water while the air is escaping by means of what I call "water-dividers." Said water-dividers consist of pans E, having their bottoms thickly studded on the under side with bosses or teats $f$. The said bosses or nipples $f$ are perforated to permit the water to flow downward through the bottoms of the said pans in a finely-divided state, the bosses or nipples preventing the water from the different perforations from running together into a mass, as it would do otherwise, more or less. A sufficient number of the said dividers are placed and fastened at intervals in the upper part of the hollow column A to divide the water again and again and expose new surfaces, while external atmospheric pressure is removed therefrom by the air-pump.

The inflow of water in proper quantity is automatically regulated by a valve, $g$, connected by a stem, $h$, which passes down through the water-dividers E to a float, I, which only allows the water-column in the cylinder A to reach a definite height, at which the said valve is closed by the said float, or, as the water-column approaches the point of elevation where the said valve would be wholly closed, diminishes the flow of water into the hollow column, thereby regulating the supply of water to the apparatus. Centrical rims $k$, Fig. 2, are formed around the openings in the bottoms of the water-dividers E, through which the stem $h$ loosely passes, leaving room for the passage of the air through said openings. Annular spaces are also left between the dividers F and the inside of the hollow column A, for the free passage of air.

The water, flowing into the apparatus through the inlet C, is again and again finely divided by the water-dividers E; at the same time, the air being exhausted from the upper part of the hollow column, the air contained in the water rapidly escapes, and in this way very perfect deaeration is effected.

I claim—

1. In combination with the hollow column, its inlet-pipe, and perforated water-dividers having central openings, the float I, valve $g$, and valve-stem $h$, passing through the central openings in the water-dividers, which act as guides to the valve-stem, substantially as and for the purposes hereinbefore set forth.

2. The water-dividers secured in the hollow column, and consisting of pans E, having the under sides of their bottoms constructed with perforated downwardly-projecting bosses or nipples $f$, substantially as and for the purposes hereinbefore described.

EMIL BÜRGIN.

Witnesses:
 HENRY T. BROWN,
 FRED. HAYNES.